(12) United States Patent
Kovacheva et al.

(10) Patent No.: US 10,721,125 B2
(45) Date of Patent: Jul. 21, 2020

(54) SYSTEMS AND METHODS FOR UPDATE PROPAGATION BETWEEN NODES IN A DISTRIBUTED SYSTEM

(71) Applicant: VMware, Inc., Palo Alto, CA (US)

(72) Inventors: Diana Kovacheva, Sofia (BG); Miroslav Mitevski, Sofia (BG); Ivo Petkov, Sofia (BG); Borislav Ivanov, Sofia (BG); Gospodin Gochkov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 153 days.

(21) Appl. No.: 15/655,214

(22) Filed: Jul. 20, 2017

(65) Prior Publication Data

US 2019/0028331 A1 Jan. 24, 2019

(51) Int. Cl.
| | |
|---|---|
| *G06F 9/455* | (2018.01) |
| *H04L 12/24* | (2006.01) |
| *G06F 8/65* | (2018.01) |
| *G06F 16/27* | (2019.01) |
| *G06F 8/71* | (2018.01) |
| *G06F 9/50* | (2006.01) |

(52) U.S. Cl.
CPC .............. *H04L 41/082* (2013.01); *G06F 8/65* (2013.01); *G06F 8/71* (2013.01); *G06F 9/45558* (2013.01); *G06F 16/27* (2019.01); *H04L 41/0806* (2013.01); *H04L 41/12* (2013.01); *G06F 9/5005* (2013.01); *G06F 2009/45562* (2013.01); *G06F 2009/45579* (2013.01); *H04L 41/046* (2013.01)

(58) Field of Classification Search
CPC ....... G06F 2009/45562; G06F 9/45533; G06F 8/658; H04L 67/10
See application file for complete search history.

(56) References Cited

U.S. PATENT DOCUMENTS

| | | | |
|---|---|---|---|
| 8,966,027 B1 * | 2/2015 | Brandwine | G06F 9/45533 709/221 |
| 9,558,074 B2 * | 1/2017 | Wade | G06F 3/065 |
| 9,882,929 B1 * | 1/2018 | Ettema | H04L 63/1491 |
| 10,114,834 B2 * | 10/2018 | Yin | G06F 9/45558 |
| 10,341,199 B2 * | 7/2019 | Peri | H04L 41/5045 |
| 2006/0184935 A1 * | 8/2006 | Abels | G06F 9/5077 718/1 |
| 2012/0066680 A1 * | 3/2012 | Amano | G06F 8/658 718/1 |

(Continued)

*Primary Examiner* — Brian T Pendleton
*Assistant Examiner* — Frank Johnson
(74) *Attorney, Agent, or Firm* — Hanley, Flight and Zimmerman, LLC

(57) ABSTRACT

Methods and apparatus to propagate an update between nodes in a distributed environment are disclosed. An example apparatus includes a first virtual appliance configured to install an update using an update file from a first update repository, the first update repository located apart from the first virtual appliance, the first virtual appliance configured to form a second update repository at the first virtual appliance, the second update repository to include a copy of the update file from the first update repository. The example apparatus also includes a second virtual appliance, the second virtual appliance formed as a replica of the first virtual appliance, the second virtual appliance to install the update using the copy of the update file from the second update repository.

20 Claims, 11 Drawing Sheets

(56) References Cited

U.S. PATENT DOCUMENTS

| | | | |
|---|---|---|---|
| 2013/0024722 A1* | 1/2013 | Kotagiri | G06F 11/1004 |
| | | | 714/6.1 |
| 2014/0237464 A1* | 8/2014 | Waterman | G06F 8/65 |
| | | | 717/172 |
| 2015/0089479 A1* | 3/2015 | Chen | G06F 11/3664 |
| | | | 717/124 |
| 2015/0106581 A1* | 4/2015 | Shimmitsu | G06F 3/065 |
| | | | 711/162 |
| 2015/0339149 A1* | 11/2015 | Tian | G06F 8/63 |
| | | | 711/114 |
| 2016/0092203 A1* | 3/2016 | Filali-Adib | G06F 9/4856 |
| | | | 717/171 |
| 2016/0117163 A1* | 4/2016 | Fukui | G06F 8/65 |
| | | | 717/171 |
| 2017/0185441 A1* | 6/2017 | Hay | G06F 9/455 |
| 2017/0262183 A1* | 9/2017 | Suzuki | G06F 3/0604 |
| 2018/0260237 A1* | 9/2018 | Noll | G06F 9/45558 |
| 2019/0179711 A1* | 6/2019 | Luo | G06F 11/1451 |

\* cited by examiner

SYSTEMS AND METHODS FOR UPDATE PROPAGATION BETWEEN NODES IN A DISTRIBUTED SYSTEM

FIELD OF THE DISCLOSURE

The present disclosure relates generally to cloud computing and, more particularly, to methods and apparatus to propagate updates between nodes in a distributed environment such as a cloud computing environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
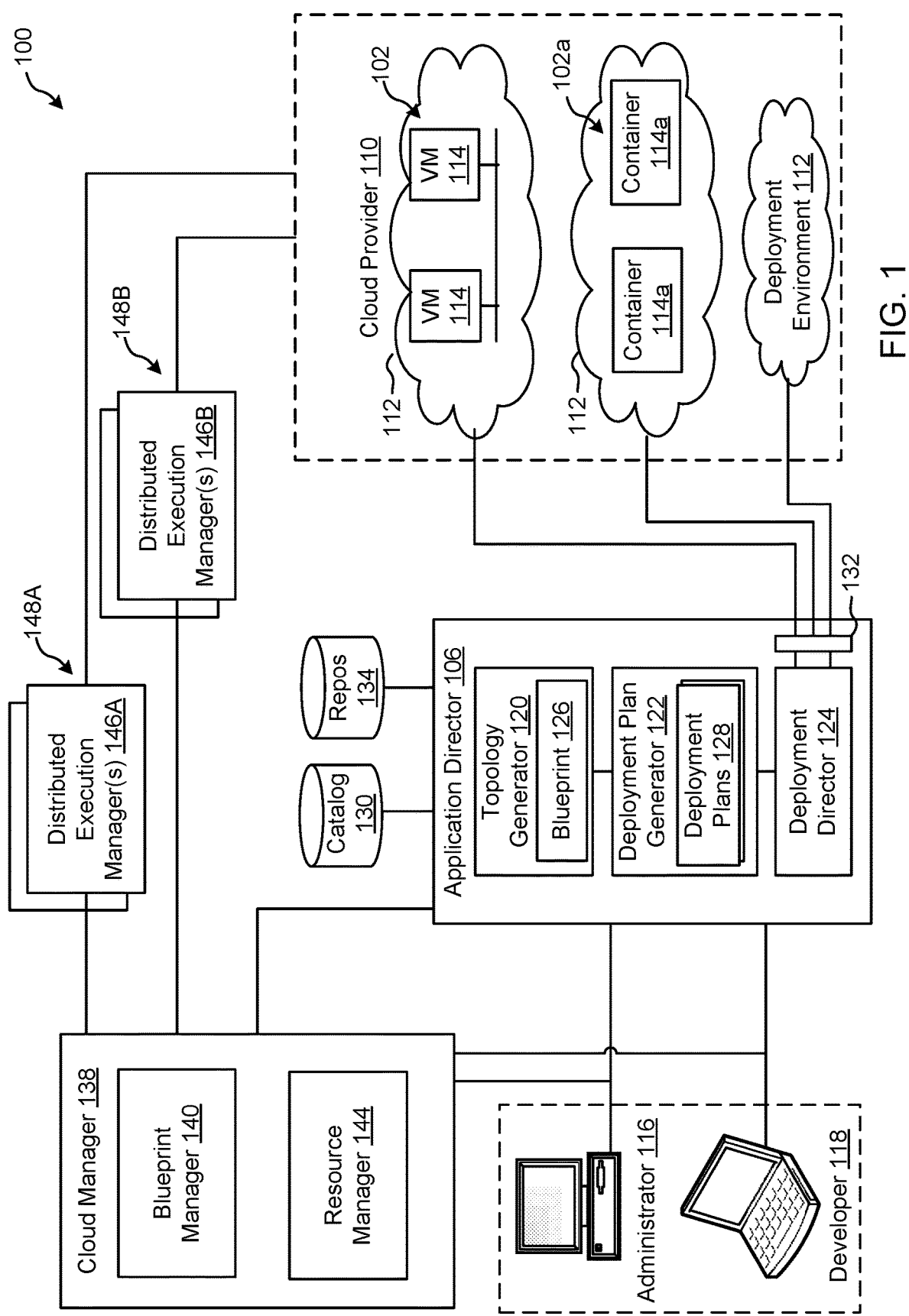
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in its entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc.

The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
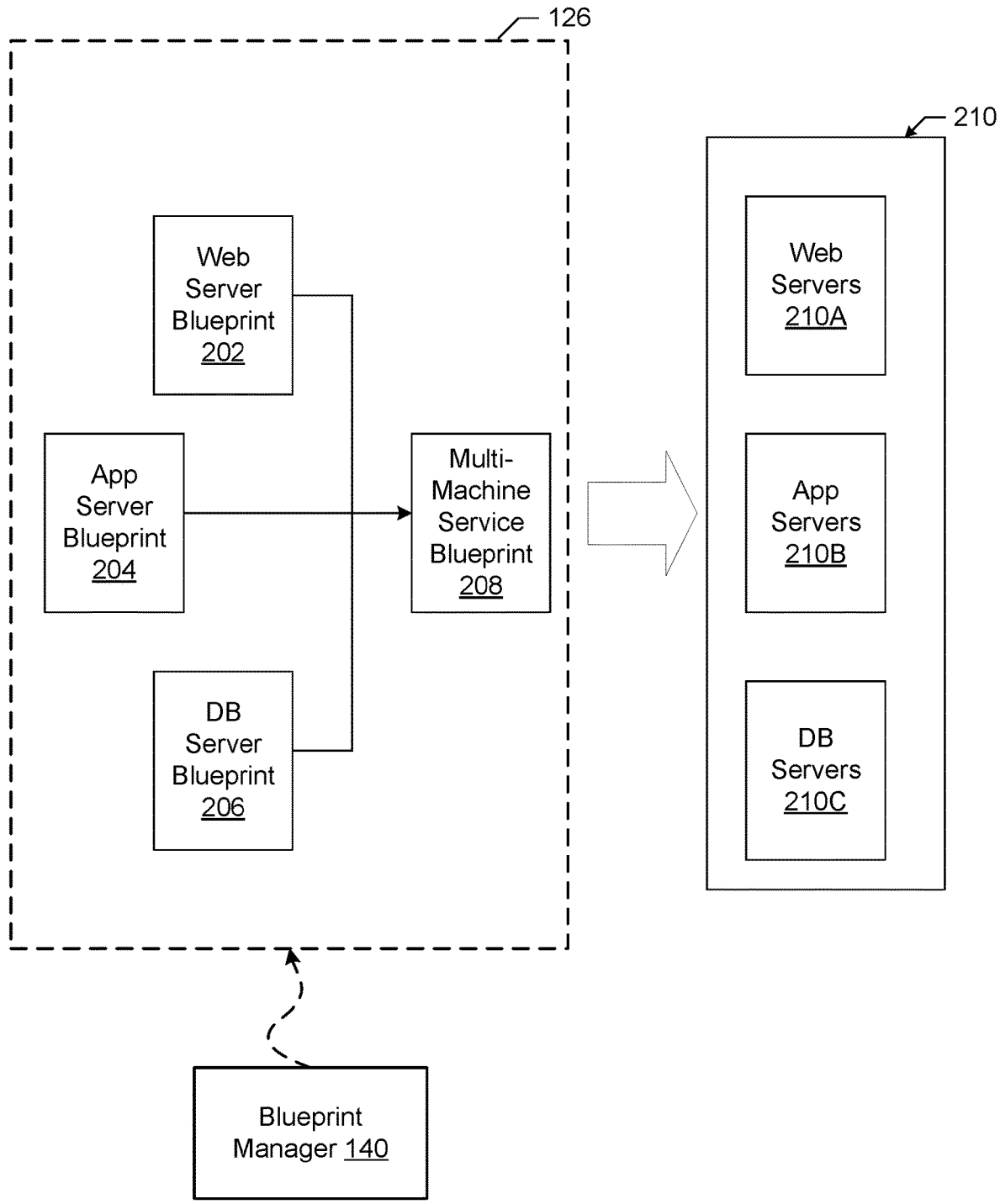
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
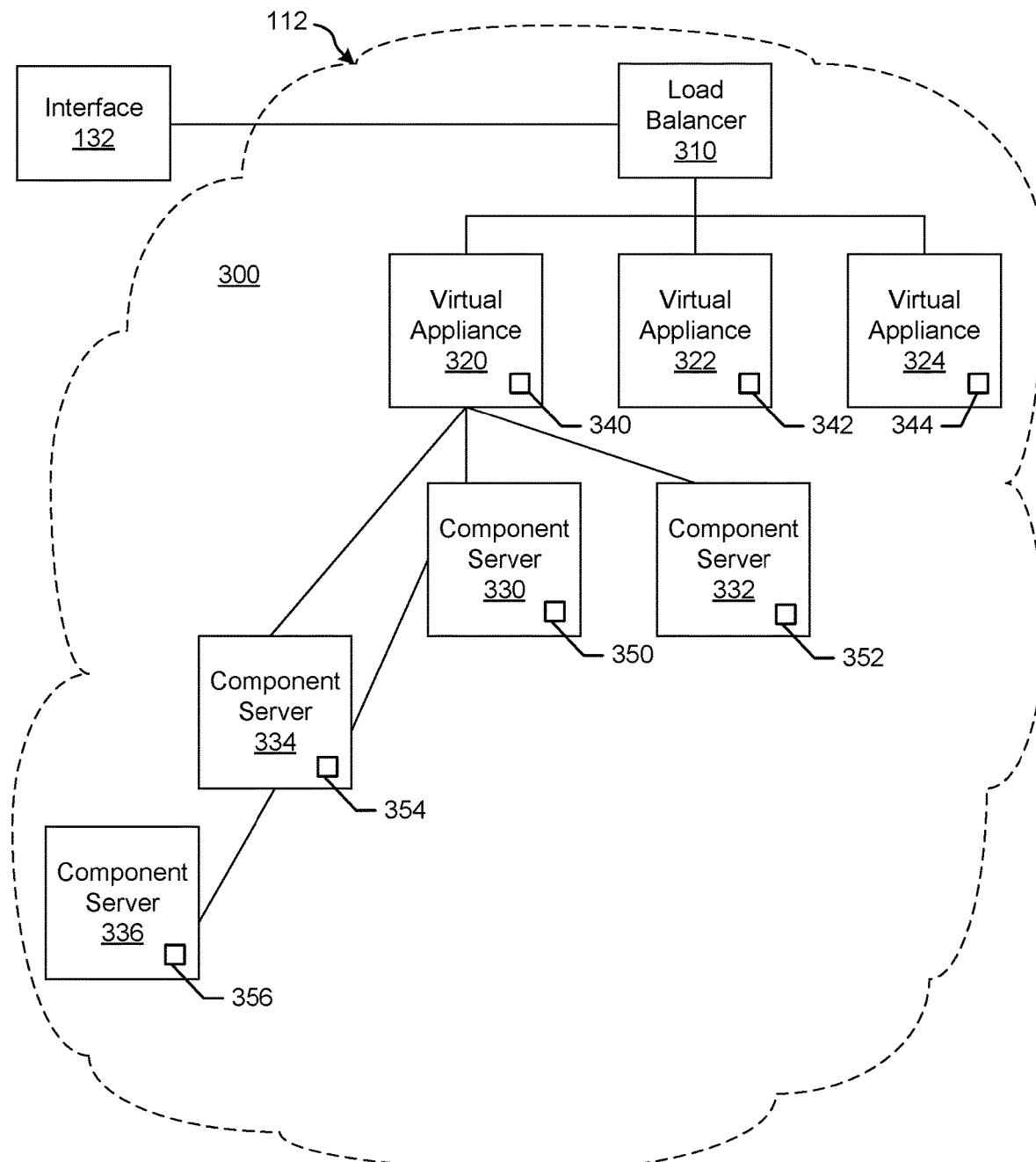
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
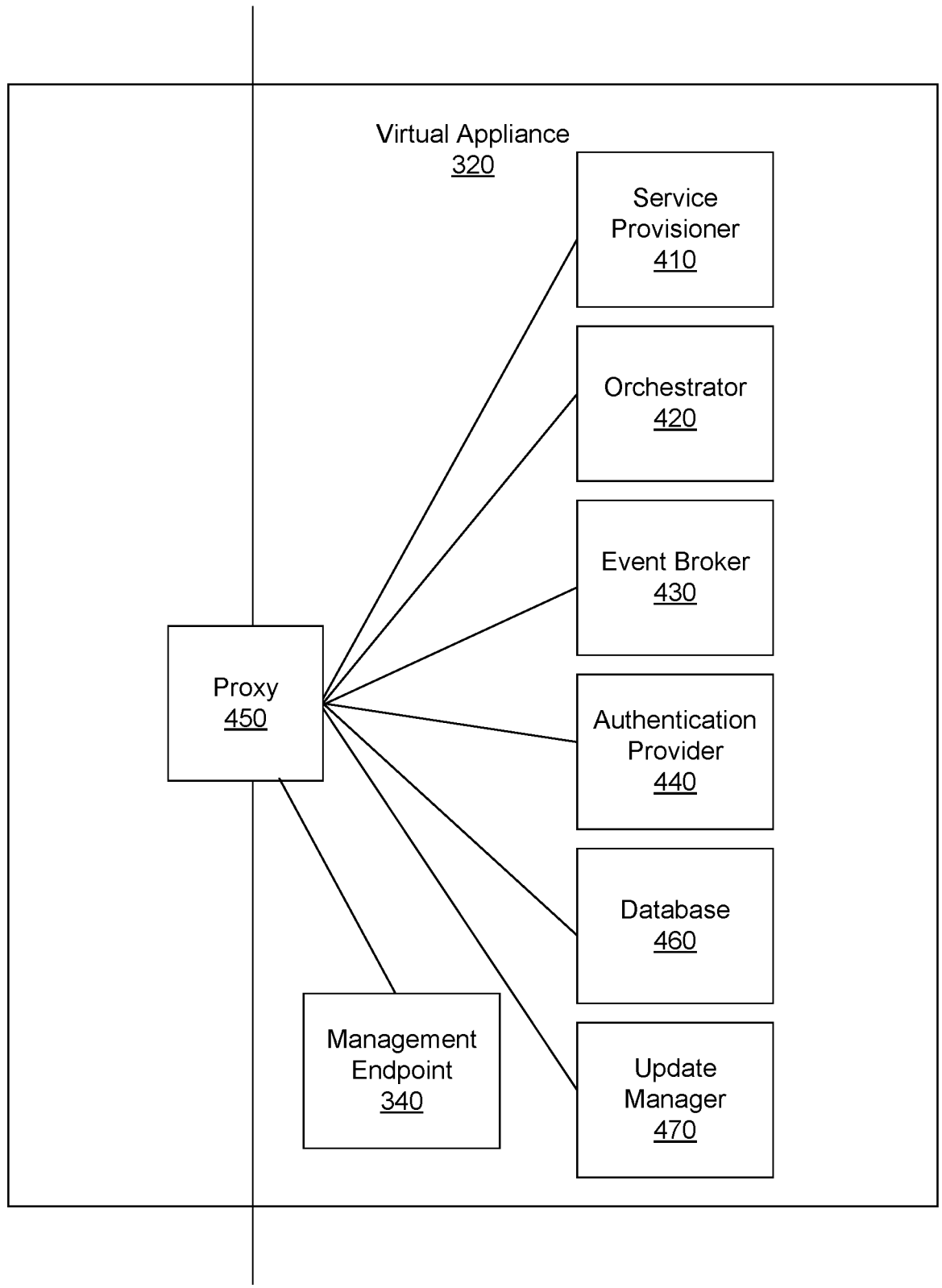
FIG. 4 illustrates an example implementation of a virtual appliance.

FIG. 4 illustrates an example implementation of the vA 320. In the example of FIG. 4, the vA 320 includes a service provisioner 410, an orchestrator 420, an event broker 430, an authentication provider 440, an internal reverse proxy 450, a database 460, and an update manager 470. The components 410, 420, 430, 440, 450, 460, 470 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example. The example update handler 470 facilitates upgrade and/or other update of the vA 320 from one or more sources (e.g., an external repository, internal relay, etc.).

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Example Replication

In certain examples, as described above, each vA 320, 322, 324 includes a management endpoint 340, 342, 344, and each component server 330, 332, 334, 336 includes a management agent 350, 352, 354, 356. The management agents 350-356 synchronize component servers 330-336 with the vA 320-324 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336. In certain examples, installation of software, such as an update and/or upgrade to the vA 320-324 can be facilitated by installing software on a master vA 320 and then replicating that installation on a plurality of replica vA 322-324 to eliminate manual installation on the other vA 322-324.

A replica vA 322, 324 is a copy of the master vA 320 including the same software, prerequisites, etc., as the master vA 320, for example. While the replica vA 322, 324 is separately addressable (e.g., different identifier, media access control (MAC) address, etc.), the replica or clone is otherwise a copy of the vA 320. Installing an update, upgrade, and/or other software on a plurality of vA 320-324 can be time consuming. With replicas 322-324, the master vA 320 can be copied from a single installation and configuration process, for example.

Replicas or clones are useful, for example, when many identical virtual machines are to be deployed in a group. For example, a company, department, etc., can clone a virtual machine for each employee, with a suite of preconfigured office applications. A virtual machine can be configured with a complete development environment and then cloned repeatedly as a baseline configuration for software testing, for example. A teacher can clone a virtual machine for each student, with all the lessons and labs required for the term loaded on each cloned machine. With clones, complete copies of a virtual machine can be conveniently made without browsing a host file system or worrying if all configuration files have been located.

Replicas or clones can be full or linked clones/replicas, for example. A full clone is an independent copy of a virtual machine that shares nothing with the parent virtual machine after the cloning operation. Ongoing operation of a full clone is entirely separate from the parent virtual machine. A linked clone is a copy of a virtual machine that shares virtual disks with the parent virtual machine in an ongoing manner. Sharing conserves disk space and allows multiple virtual machines to use the same software installation, for example.

A full clone is an independent virtual machine with no need to access the parent. Full clones do not require an ongoing connection to the parent virtual machine. Because a full clone does not share virtual disks with the parent virtual machine, full clones generally perform better than linked clones. However, full clones take longer to create than linked clones. Creating a full clone can take several minutes if the files involved are large.

A linked clone is made from a snapshot of the parent. A snapshot captures an entire state of a virtual machine at the time the snapshot is taken. A snapshot can include contents of the virtual machine's memory, virtual machine settings, state of the virtual machines' disks, etc. Files available on the parent at the moment of the snapshot continue to remain available to the linked clone. Ongoing changes to the virtual disk of the parent do not affect the linked clone, and changes to the disk of the linked clone do not affect the parent.

A linked clone or replica must have access to the parent. Without access to the parent, a linked clone is disabled. Linked clones are created swiftly, so a unique virtual machine can be easily created for each task to be done. A virtual machine can be easily shared with other users by storing the virtual machine on a local network, where other users can quickly make a linked clone. This facilitates collaboration: for example, a support team can reproduce a bug in a virtual machine, and an engineer can quickly make a linked clone of that virtual machine to work on the bug.

A full clone or replica is a complete and independent copy of a virtual machine. However, the full clone duplicates only the state of the virtual machine at the instant of the cloning operation. Thus, the full clone does not have access to any snapshots that may exist of the parent virtual machine.

Example Systems and Methods to Update

Upgrading and/or otherwise updating (referred to herein as "updating" or "update" for convenience in description) a distributed system including multiple nodes of the same type (e.g., multiple vAs 320-324, etc.) can involve many manual user actions to trigger the update and/or upgrade process on each machine individually. Such a manual user process also requires all the update/upgrade packages to be downloaded to each machine from the same source.

Even in an automated update process, prerequisite evaluations must be completed on all affected machines (e.g., all vAs 320-324), which involves shutting down replica nodes or stopping the services on those replica nodes. An update is triggered on the master appliance, and the master update must finish and reboot before the replica appliances can begin the update procedure. Each replica node must then rejoin its cluster to synchronize configuration files that may have changed in the update process.

This process is extremely tedious and error prone at least in part because it requires a lot of manual steps in an exact order. In certain examples, to reduce manual actions, the master appliance 320 is used to trigger the update on replica nodes 322-324 during the update of the master appliance 320, triggering the replicas 322-324 to download the update package (e.g., Red Hat Package Manager (RPM) files and/or other package management files, etc.) from a master node and complete the prerequisites on the replica nodes.

Figure 5:
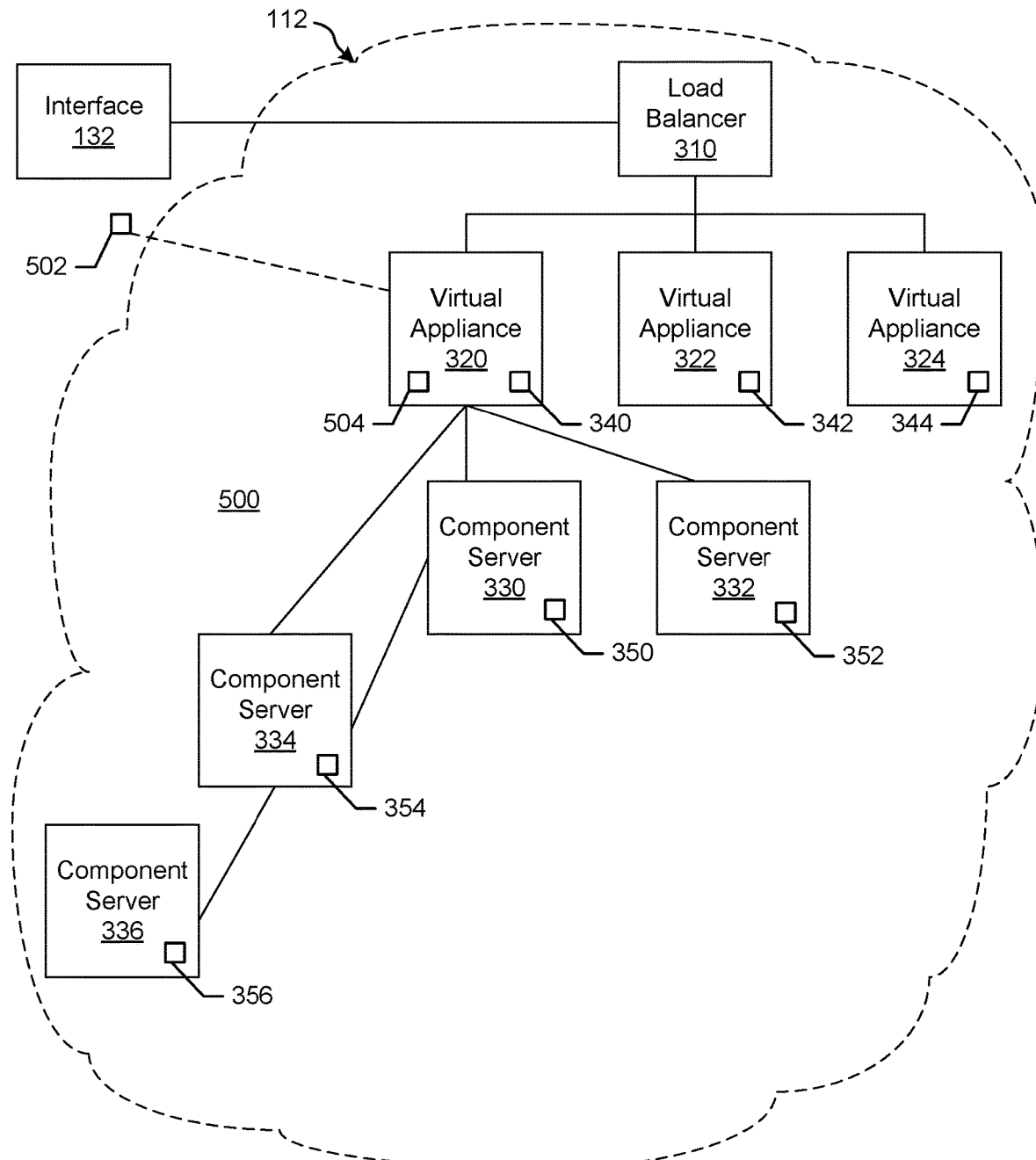
FIG. 5 illustrates an example installation of deployed virtual appliances and associated component servers including a remote update repository and local repository(-ies).

An example appliance update includes three phases: pre-update, update and post-update. Prior to pre-update, update package files are downloaded (e.g., from an update repository 502 as shown in the example of FIG. 5, etc.) by the update manager 470, and a set of packages to facilitate the update process are installed on the appliance 320-324. Then, pre-update scripts are executed to prepare the appliance 320-324 for the update. During the update, package files are executed. Then, during post-update, post-update related scripts are executed on the appliance.

In certain examples, to stop services on the replica appliances 322-324, a script is added to the pre-update scripts of the master appliance 320 (e.g., via the interface 132 and/or other trigger as shown in the example configuration 500 of FIG. 5, etc.). The added script calls an endpoint 342, 344 on the replica appliances 322, 324 to stop services such as vcac-server, rabbitmq-server, vco-server, and/or other vRA related services. Post-update, the master node 320 triggers the update of replica nodes 322-324. First, a local repository 504, mirroring or similar to the remote repository 502 of update package files, is created on the master appliance 320. Replica nodes 322-324 are configured to use the local repository 504 instead of the remote repository 502 from which the master node 320 downloaded its update files. Thus, the replica nodes 322-324 can access update content locally, rather than remotely, and access it concurrently with other replica nodes 322-324, rather than in sequence. Update of replicas 322-324 is triggered in parallel for replicas 322-324 (e.g., avoiding a sequential wait of 20-30 minutes for each update to complete serially, etc.). After update, configuration data is synchronized between the nodes 320-324.

For example, the master vA 320 completes the update/upgrade and provides feedback and/or other output regarding whether or not the update was successful or unsuccessful. The master vA 320 then reboots, and the reboot of the master vA 320 triggers the reboot of the replica vAs 322-324 to complete the update process, for example. In certain examples, an update/upgrade can change an entire component (e.g., vA 320-324, etc.), not just a service or part of the component.

Figure 6:
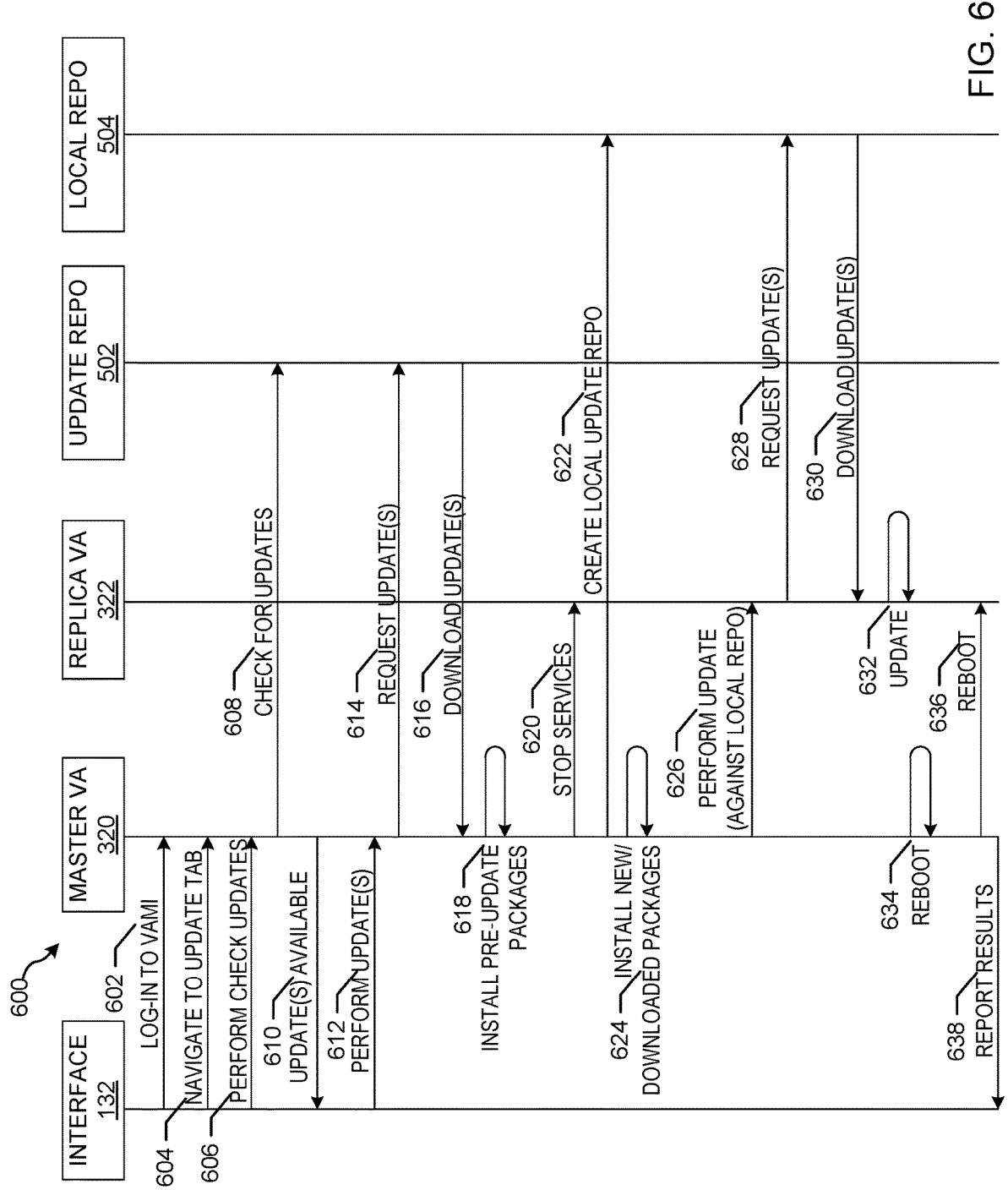
FIG. 6 illustrates an example data flow diagram showing an exchange of information between master and replica virtual appliances and associated repositories.

FIG. 6 illustrates an example data flow/sequence 600 between the master vA 320 and replica vA 322 to update in response to a trigger (e.g., via the interface 132, etc.). At 602, the interface 132 facilitates login to a virtual appliance management infrastructure (VAMI) for the master vA 320. For example, the VAMI provides a user (e.g., operator, software application, other machine, system, etc.) with console and command line interface(s) to configure network settings, check and install updates, shutdown and reboot virtual appliances, etc. At 604, an update tab, portion, option, button, etc., is accessed. For example, a tab and/or other portion of an interface (e.g., command line and/or graphical user interface, etc.) includes a button, trigger, and/or other option to initiate an update.

At 606-608, an update check is performed. For example, based on the update trigger, the update manager 470 checks the external repository 502 to determine whether or not an update is available to one or more components, services, etc., currently installed on the vA 320. Updates can include operating system update(s), application update(s), management agent/endpoint update(s), tool update(s), etc. At 610, the available update(s) are made available via the interface 132.

At 612, the update(s) are performed via the update manager 470 of the vA 320 (e.g., as triggered via the interface 132, etc.). At 614-616, requested update(s) are downloaded to the master vA 320 from the update repository 502. For example, one or more files related to operating system update(s), application update(s), management agent/endpoint update(s), tool update(s), etc., are downloaded to the master vA 320 from the update repository 502 via the update manager 470. At 618, pre-update package(s) (e.g., one or more ISO and/or other image files, executables, etc.) downloaded from the repository 502 are installed at the master vA 320. For example, pre-update packages can be installed to verify prerequisite(s), dependency(-ies), proper download(s), and/or otherwise position the vA 320 for application of the update, for example.

At 620, services at the replica vA 322 are stopped. For example, configuration service(s), connector service(s), gateway service(s), data service(s), etc., are stopped at the vA 322 (e.g., using its update manager, etc.) for the update. At 622, a local update repository 504 is created at the master vA 320 based on the update content (e.g., pre-update package(s), update file(s), etc.) downloaded from the update repository 502 by the master vA 320. Then, at 624, the update package(s) downloaded at the master vA 320 are installed at the master vA 320 (e.g., facilitated by the update manager 470).

Following completion of installation at the master vA 320, the master vA 320 triggers the replica vA 322 to perform an update with respect to the local repository 504. At 628, the replica vA 322 (e.g., using its update handler) accesses the local repository 504 to download available update(s), and, at 630, the local repository 504 provides available/applicable update(s) to the replica vA 322. The download of update(s) can occur in parallel for a plurality of replica vAs 322, 324, for example. At 632, the update(s) occur at the replica vA 322. In certain examples, a plurality of replica vA 322-324 install update(s) in parallel.

At 634, the master vA 320 reboots to complete the update process. At 636, the replica vA 322 is instructed to reboot to complete its update process. For example, update(s) complete and service(s) restart at the vA 320, 322 upon reboot to resume operation of the updated vA 320, 322. At 638, a result of the update at the master vA 320 and replica vA 322 is reported. For example, a text-based and/or graphical report can be sent to a user and/or other system via the interface 132, a log file can be created, an acknowledgement and/or other response can be sent to a triggering device, etc., to indicate success, failure, status, error(s), and/or other details regarding the update(s) of the vA 320, 322.

While example implementations of the example cloud computing system 100 and virtual machine installation 300, 500 are illustrated in FIGS. 1-6, one or more of the elements, processes and/or devices illustrated in FIGS. 1-6 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100, 300, and/or 500 of FIGS. 1-6 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100, 300, and/or 500 of FIGS. 1-6 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100, 300, and/or 500 of FIGS. 1-6 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100, 300, and/or 500 of FIGS. 1-6 may include one or more elements, processes and/or devices in addition to, or instead of, those illustrated in FIGS. 1-6, and/or may include more than one of any or all of the illustrated elements, processes and devices.

Flowcharts representative of example machine readable instructions that may be executed to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100, 300, and/or 500 of FIGS. 1-6 are shown in FIGS. 7-10. In these examples, the machine readable instructions implement programs for execution by a processor such as the processor 1112 shown in the example processor platform 1100 discussed below in connection with FIG. 11. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 7-10, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 6-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 6-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 7:
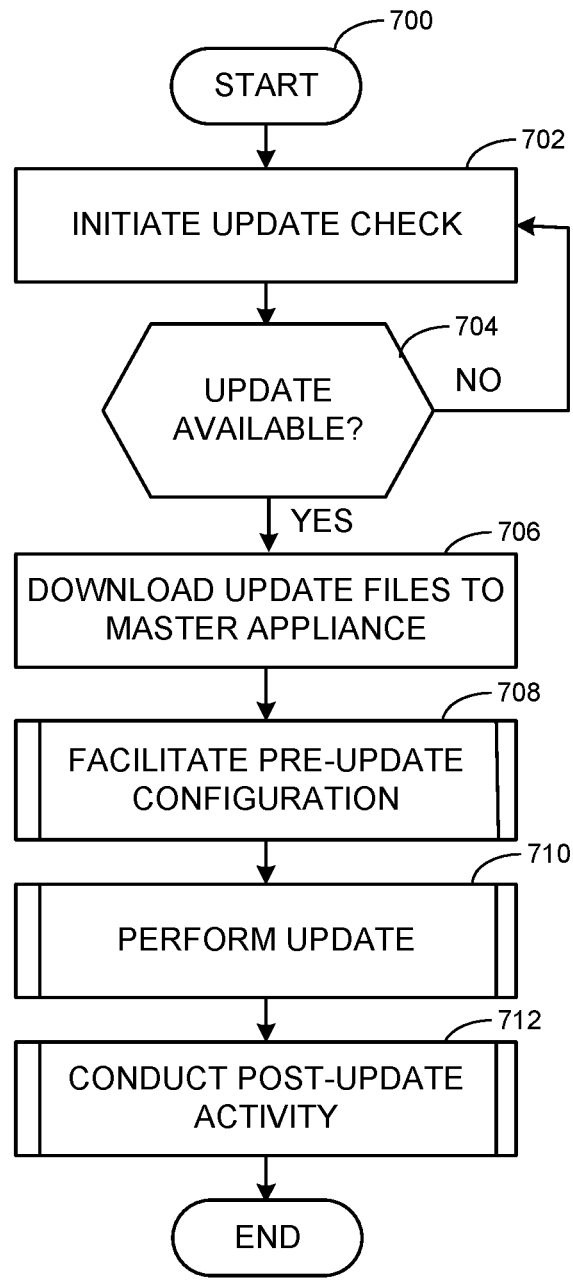
FIGS. 7-10 depict flowcharts representative of computer readable instructions that may be executed to implement the example update of virtual appliances.

FIG. 7 depicts a flowchart representative of computer readable instructions that may be executed to implement the example update of vAs 320-324. An example program 700 is illustrated in FIG. 7. Initially, at block 702, an update is initiated. For example, a user, application, system, device, etc., triggers an update of the master vA 320. At block 704, the update repository 502 is checked for available and applicable update(s). If an update is found, then, at block 706, files/packages related to the update are downloaded to the master vA 320 from the update repository 502. For example, one or more files related to operating system update(s), application update(s), management agent/endpoint update(s), tool update(s), etc. (e.g., ISO and/or other image files, executables, etc.), are downloaded to the master vA 320 from the update repository 502 via the update manager 470.

At block 708, pre-update configuration is facilitated. For example, pre-update packages can be installed to verify prerequisite(s), dependency(-ies), proper download(s), and/or otherwise position the vA 320 for application of the update, for example. In certain examples, service(s) running on the vAs 320-324 are stopped in preparation for the update(s). For example, configuration service(s), connector service(s), gateway service(s), data service(s), etc., are stopped at the vA 322 (e.g., using its update manager, etc.) for the update. Additionally, the local update repository 504 is created at the master vA 320 by the master vA 320 based on the update content (e.g., pre-update package(s), update file(s), etc.) downloaded from the update repository 502 by the master vA 320.

At block 710, the update is performed. For example, the update manager 470 facilitates installation of the downloaded update package(s) at the master vA 320, and installation of corresponding update package(s) from the local repository 504 at the replica vAs 322-324 is triggered by the update manager 470 of the master vA 320. For example, the replica vA 322 (e.g., using its update handler) accesses the local repository 504 to download available update(s), and, at 630, the local repository 504 provides available/applicable update(s) to the replica vA 322. The download of update(s) can occur in parallel for a plurality of replica vAs 322, 324, for example. At 632, the update(s) occur at the replica vA 322. In certain examples, a plurality of replica vA 322-324 install update(s) in parallel.

At block 712, post-update activity is conducted. For example, the vAs 320-324 reboot to complete the update process and restart services for vA 320-324 operation. For example, update(s) complete and service(s) restart at the vA 320-324 upon reboot to resume operation of the updated vA 320-324. Additionally, a result of the update at the master vA 320 and replica vA 322, 324 is reported. For example, a text-based and/or graphical report can be sent to a user and/or other system via the interface 132, a log file can be created, an acknowledgement and/or other response can be sent to a triggering device, etc., to indicate success, failure, status, error(s), and/or other details regarding the update(s) of the vA 320-324.

Figure 8:
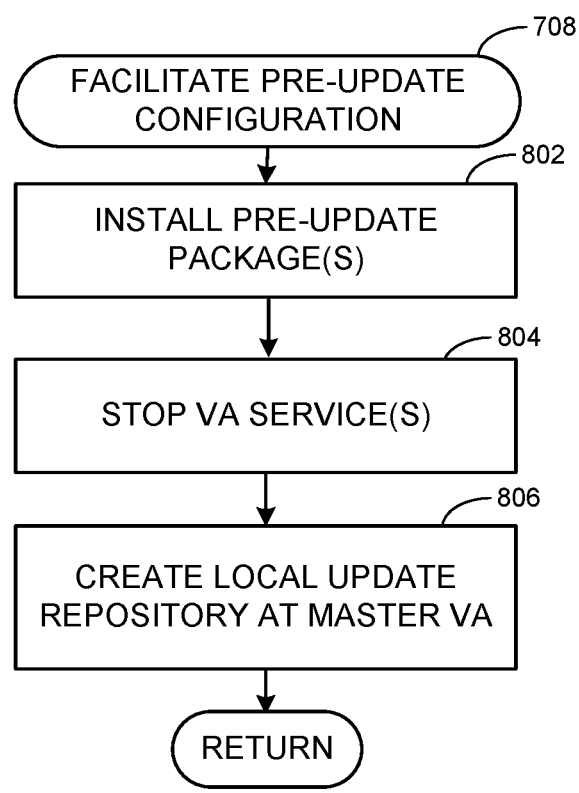

FIG. 8 illustrates further detail regarding an example implementation of facilitating pre-update configuration at block 708 of the example of FIG. 7. At block 802, pre-update packages are installed. For example, one more pre-update packages can be installed to verify prerequisite(s), dependency(-ies), proper download(s), and/or otherwise position the vA 320 for application of the update, for example. At block 804, service(s) running on the vAs 320-324 are stopped in preparation for the update(s). For example, configuration service(s), connector service(s), gateway service(s), data service(s), etc., are stopped at the vA 322, 324 (e.g., using its update manager, etc.) for the update. At block 806, the local update repository 504 is created at the master vA 320 by the master vA 320 based on the update content (e.g., pre-update package(s), update file(s), etc.) downloaded from the update repository 502 by the master vA 320. For example, the update manager 470 identifies the update content downloaded to the master vA 320 from the update repository 502 and organizes the update content as a local repository 504 accessible by the replica vAs 322-324 in place of the remote update repository 502. Rather than interacting with the remote update repository 502 and incurring data communication delays, the replica vA(s) 322-324 can interact with and obtain their update content from the local repository 504 formed at the master vA 320, for example. Such a local repository improves responsiveness, reduces update time, reduces external communication, and provides other technological improvements and benefits to updating a virtual computing system, for example. Control then returns to block 710 to perform the update.

Figure 9:
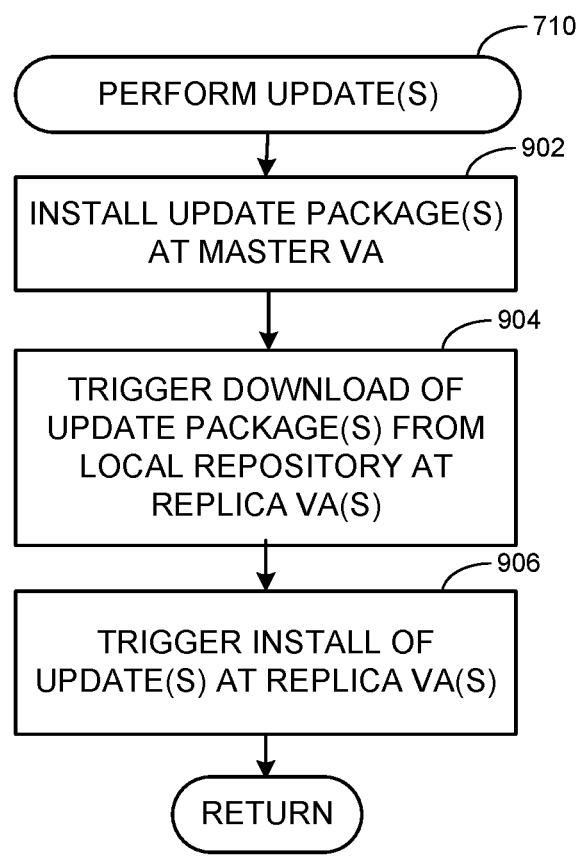

FIG. 9 illustrates further detail regarding an example implementation of facilitating pre-update configuration at block 710 of the example of FIG. 7. At block 902, updated packages are installed at the master vA 320. For example, the update manager 470 facilitates installation of the downloaded update package(s) at the master vA 320. At block 904, update packages are downloaded for installation from the local repository 504 at the replica vA 322-324. For example, installation of corresponding update package(s) from the local repository 504 at the replica vAs 322-324 is triggered by the update manager 470 of the master vA 320. For example, the replica vA 322, 324 (e.g., using its update handler) accesses the local repository 504 to download available update(s) to the replica vA 322, 324. At block 906, the update(s) are installed at the replica vAs 322-324. The download and installation of update(s) can occur in parallel for a plurality of replica vAs 322, 324, for example. Control then returns to block 712 for post-update processing.

Figure 10:
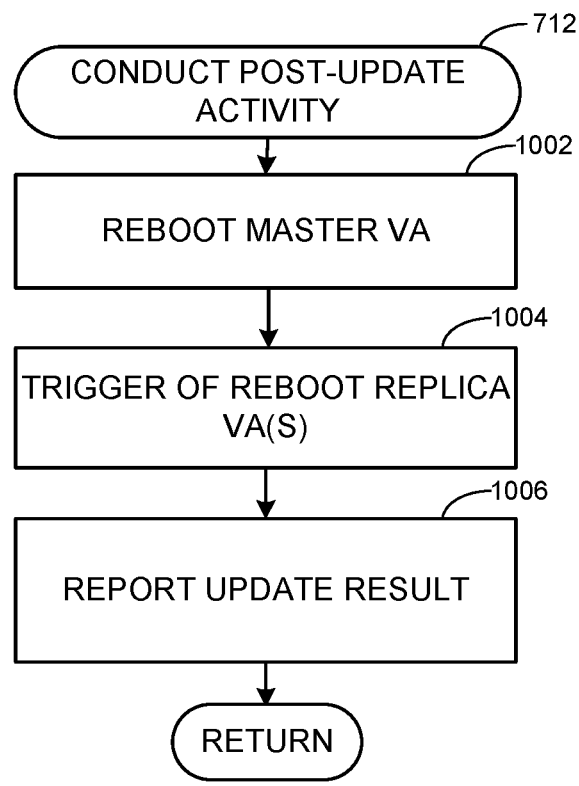

FIG. 10 illustrates further detail regarding an example implementation of conducting post-update activity at block 712 of the example of FIG. 7. At block 1002, the master vA 320 reboots to complete the update process. For example, a reboot of the master vA 320 executes the updated functionality and restarts service(s) of the vA 320 for operation. At block 1004, the replica vA 322-324 are reboot to complete their update process. For example, the replica vAs 322-324 reboot to complete the update process and restart services for vA 322-324 operation. For example, update(s) complete and service(s) restart at the vA 320-324 upon reboot to resume operation of the updated vA 320-324. At block 1006, a result of the update at the master vA 320 and replica vA 322, 324 is reported. For example, a text-based and/or graphical report can be sent to a user and/or other system via the interface 132, a log file can be created, an acknowledgement and/or other response can be sent to a triggering device, etc., to indicate success, failure, status, error(s), and/or other details regarding the update(s) of the vA 320-324.

Figure 11:
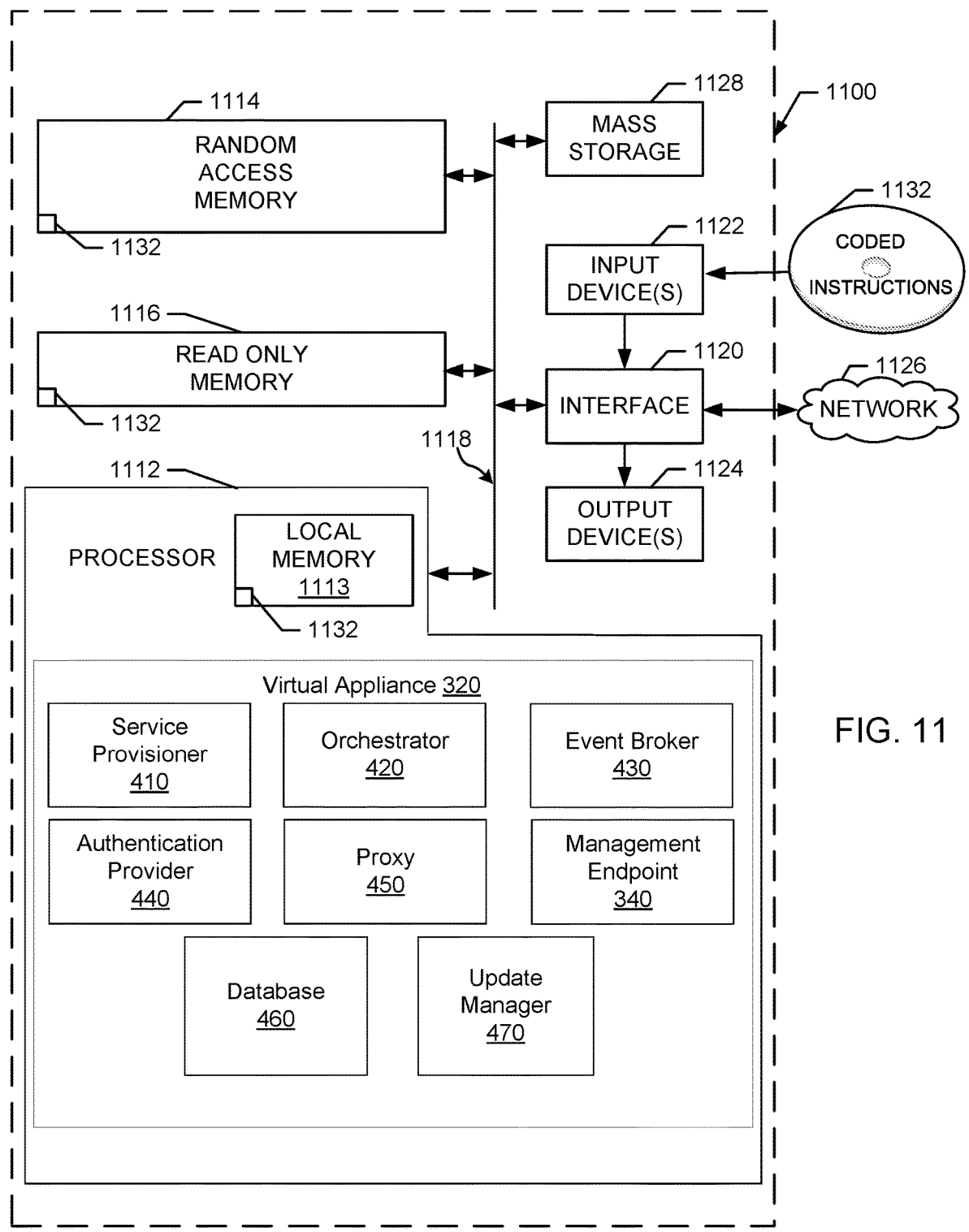
FIG. 11 is a block diagram of an example processing platform capable of executing the example machine-readable instructions of FIGS. 7-10 to implement the systems and data flows of FIGS. 1-6.

FIG. 11 is a block diagram of an example processor platform 1100 capable of executing the instructions of FIGS. 7-10 to implement the example systems, operation, and management of FIGS. 1-6. The processor platform 1000 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache), and executes instructions to implement the example systems 100, 300, 500 or portions thereof, such as the vA 320-324, component server 330-336, management endpoint 340-344, and management agent 350-356. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include flash devices, floppy disk drives, hard drive disks, optical compact disk (CD) drives, optical Blu-ray disk drives, RAID systems, and optical digital versatile disk (DVD) drives.

Coded instructions 1132 representative of the example machine readable instructions of FIGS. 8-9 may be stored in the mass storage device 1128, in the volatile memory 1114, in the non-volatile memory 1116, and/or on a removable tangible computer readable storage medium such as a CD or DVD.

In certain examples, the processor 1112 can be used to implement the virtual appliance 320 (and vAs 322-324) and the component server 330 (and servers 332-336) and their components including the management endpoint 340, service provisioner 410, orchestrator 420, event broker 430, authentication provider 440, proxy 450, database 460, update manager 470, etc.

From the foregoing, it will be appreciated that the above disclosed methods, apparatus and articles of manufacture facilitate cloning an agent in a distributed environment such as a cloud computing environment and management of agents in the distributed environment. Examples disclosed herein facilitate self-evaluation and registration of cloned servers and agents without further user intervention or cloud oversight.

An example apparatus includes a first virtual appliance configured to install an update using an update file from a first update repository, the first update repository located apart from the first virtual appliance, the first virtual appliance configured to form a second update repository at the first virtual appliance, the second update repository to include a copy of the update file from the first update repository. The example apparatus also includes a second virtual appliance, the second virtual appliance formed as a replica of the first virtual appliance, the second virtual appliance to install the update using the copy of the update file from the second update repository.

In some examples, the first virtual appliance is to install a pre-update package to prepare for the update. In some examples, the pre-update package includes a prerequisite check for the update. In some examples, the first virtual appliance is to stop services at the second virtual appliance prior to the update by the second virtual appliance.

In some examples, the first virtual appliance and the second virtual appliance are to reboot following the update. In some examples, the first virtual appliance is to trigger the reboot of the second virtual appliance.

In some examples, the apparatus further includes a third virtual appliance, the third virtual appliance formed as a replica of the first virtual appliance, the third virtual appliance to install the update using the copy of the update file from the second update repository in parallel with the second virtual appliance.

An example computer readable storage medium includes instructions that, when executed, cause a machine to implement at least a first virtual appliance configured to install an update using an update file from a first update repository, the first update repository located apart from the first virtual appliance, the first virtual appliance configured to form a second update repository at the first virtual appliance, the second update repository to include a copy of the update file from the first update repository; and a second virtual appliance, the second virtual appliance formed as a replica of the first virtual appliance, the second virtual appliance to install the update using the copy of the update file from the second update repository.

In some examples, the first virtual appliance is to install a pre-update package to prepare for the update. In some examples, the pre-update package includes a prerequisite check for the update. In some examples, the first virtual appliance is to stop services at the second virtual appliance prior to the update by the second virtual appliance.

In some examples, the first virtual appliance and the second virtual appliance are to reboot following the update. In some examples, the first virtual appliance is to trigger the reboot of the second virtual appliance.

In some examples, the storage medium includes instructions that, when executed, cause the machine to implement a third virtual appliance, the third virtual appliance formed as a replica of the first virtual appliance, the third virtual appliance to install the update using the copy of the update file from the second update repository in parallel with the second virtual appliance.

An example method includes retrieving, at a first virtual appliance, an update file from a first update repository, the first update repository located apart from the first virtual appliance. The example method includes forming, at the first virtual appliance, a second update repository including the update file from the first update repository. The example method includes installing, at the first virtual appliance, an update using the update file. The example method includes triggering installation, at a third virtual appliance, the second virtual appliance formed as a replica of the first virtual appliance, installation of the update using the copy of the update file from the second update repository.

In some examples, the method further includes installing, at the first virtual appliance, a pre-update package to prepare for the update. In some examples, the pre-update package includes a prerequisite check for the update. In some examples, the method further includes stopping services at the second virtual appliance prior to the update by the second virtual appliance.

In some examples, the method further includes rebooting the first virtual appliance and the second virtual appliance following the update.

In some examples, the method further includes installing, at a third virtual appliance, the update using the update file from the second update repository in parallel with installing the update at the second virtual appliance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a first virtual appliance configured to install an update from an update file of a first update repository, the first update repository located apart from the first virtual appliance, the first virtual appliance configured to form a second update repository at the first virtual appliance, the second update repository to include a copy of the update file from the first update repository; and
   a second virtual appliance, the second virtual appliance formed as a replica of the first virtual appliance, the second virtual appliance to, upon a trigger by the first virtual appliance instructing the second virtual appliance to update from the second update repository following the installation of the update at the first virtual appliance, install the update using the copy of the update file from the second update repository,
   the first virtual appliance and the second virtual appliance to synchronize configuration after the first virtual appliance and the second virtual appliance have installed the update.

2. The apparatus of claim 1, wherein the first virtual appliance is to install a pre-update package to prepare for the update.

3. The apparatus of claim 2, wherein the pre-update package includes a prerequisite check for the update.

4. The apparatus of claim 2, wherein the first virtual appliance is to stop services at the second virtual appliance prior to installation of the update by the second virtual appliance.

5. The apparatus of claim 1, wherein the first virtual appliance and the second virtual appliance are to reboot following installation of the update.

6. The apparatus of claim 5, wherein the first virtual appliance is to trigger the reboot of the second virtual appliance.

7. The apparatus of claim 1, further including a third virtual appliance, the third virtual appliance formed as a replica of the first virtual appliance, the third virtual appliance to install the update using the copy of the update file from the second update repository in parallel with the second virtual appliance.

8. A tangible computer readable storage medium comprising instructions that, when executed, cause a machine to at least:

retrieve, at a first virtual appliance, an update file from a first update repository, the first update repository located apart from the first virtual appliance;

form, at the first virtual appliance, a second update repository including a copy of the update file from the first update repository;

install, at the first virtual appliance, an update using the update file; and trigger, by the first virtual appliance, installation of the update at a second virtual appliance using the copy of the update file from the second update repository, the second virtual appliance formed as a replica of the first virtual appliance, the trigger to instruct the second virtual appliance to update from the second update repository; and synchronize configuration after the first virtual appliance and the second virtual appliance have installed the update.

9. The storage medium of claim 8, wherein the instructions, when executed, cause the first virtual appliance to install a pre-update package to prepare for the update.

10. The storage medium of claim 9, wherein the pre-update package includes a prerequisite check for the update.

11. The storage medium of claim 9, wherein the instructions, when executed, cause the first virtual appliance to stop services at the second virtual appliance prior to the update by the second virtual appliance.

12. The storage medium of claim 8, wherein the instructions, when executed, cause the first virtual appliance and the second virtual appliance to reboot following installation of the update.

13. The storage medium of claim 12, wherein the first virtual appliance is to trigger the reboot of the second virtual appliance.

14. The storage medium of claim 8, wherein the instructions, when executed, cause the machine to implement a third virtual appliance, the third virtual appliance formed as a replica of the first virtual appliance, the third virtual appliance to install the update using the copy of the update file from the second update repository in parallel with the second virtual appliance.

15. A method comprising:

retrieving, at a first virtual appliance, an update file from a first update repository, the first update repository located apart from the first virtual appliance;

forming, at the first virtual appliance, a second update repository including a copy of the update file from the first update repository;

installing, at the first virtual appliance, an update using the update file;

triggering, by the first virtual appliance, installation of the update at a second virtual appliance using the copy of the update file from the second update repository, the second virtual appliance formed as a replica of the first virtual appliance, the triggering to instruct the second virtual appliance to update from the second update repository; and synchronizing configuration after the first virtual appliance and the second virtual appliance have installed the update.

16. The method of claim 15, further including installing, at the first virtual appliance, a pre-update package to prepare for the update.

17. The method of claim 16, wherein installing the pre-update package includes checking prerequisites for the update.

18. The method of claim 16, further including stopping services at the second virtual appliance prior to the update by the second virtual appliance.

19. The method of claim 15, further including rebooting the first virtual appliance and the second virtual appliance following installation of the update.

20. The method of claim 15, further including installing, at a third virtual appliance, the update using the copy of the update file from the second update repository in parallel with installing the update at the second virtual appliance.

* * * * *